United States Patent
Dahlberg

(10) Patent No.: US 7,526,413 B2
(45) Date of Patent: Apr. 28, 2009

(54) VOLUMETRIC LAMINATED SAND ANALYSIS

(75) Inventor: Kenneth E. Dahlberg, Kingwood, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 1810 days.

(21) Appl. No.: 10/042,475

(22) Filed: Jan. 9, 2002

(65) Prior Publication Data

US 2002/0133323 A1    Sep. 19, 2002

Related U.S. Application Data

(60) Provisional application No. 60/265,659, filed on Jan. 31, 2001.

(51) Int. Cl.
    *G06F 7/60*    (2006.01)
(52) U.S. Cl. .............................................. 703/2; 703/10
(58) Field of Classification Search ...................... 702/7
    See application file for complete search history.

(56) References Cited

U.S. PATENT DOCUMENTS

| | | | | |
|---|---|---|---|---|
| 5,461,562 | A | * | 10/1995 | Tabanou et al. ................. 702/11 |
| 5,675,147 | A | | 10/1997 | Ekstrom et al. ............. 250/256 |
| 5,838,634 | A | | 11/1998 | Jones et al. .................... 367/73 |
| 6,603,313 | B1 | * | 8/2003 | Srnka .......................... 324/354 |

FOREIGN PATENT DOCUMENTS

WO    WO 00/48022    *    8/2000

OTHER PUBLICATIONS

"The Analysis of Some Unsolved Induction Interpretation Problems using Computer Modeling" Barbara Anderson. SPWLA 27th Annual Logging Symposium, Jun. 9-13, 1986.*
"Applications of NMR Measurements for Petrophysical Evaluation of Low-Resistivity Pay Zones". Gary M. Ostroff and David S. Shorey. 2000 Canadian Society of Exploratory Geophysicists Conference. May 31, 2000.*
"Predictive Modeling of Naturally Fractured Reservoirs using Geomechanics and Flow Simulation" Stephen Bourne et al. Society of Petroleum Engineers 87253. Oct. 2000.*
Allen, D. F., Barber, T., Flaum, C., Hemingway, J., Anderson, B., des Ligneris, S., Everett, R., and Morriss, C., 1988, "Advances in High Resolution Logging", The Technical Review, Schlumberber, v. 36, No. 2, pp. 4-14.
American Geological Institute, 1984, Dictionary of Geological Terms, 3rd Edition, R. L. Bates and J. A. Jackson, eds., Anchor Books, Doubleday, New York, p. 571.

(Continued)

*Primary Examiner*—Kamini S Shah
*Assistant Examiner*—Saif A Alhija

(57) ABSTRACT

A method of analyzing well log data from thinly bedded reservoirs to obtain estimates of hydrocarbon pore volume. In the method, a model of the reservoir is established for an interval that is to be analyzed. Within the analysis interval, a set of bed types is identified consisting of sandstone beds and shale beds. For each bed type, parameter values are assigned and calculations are made of the theoretical log response of each bed type. The estimated log responses are compared to measured log responses to determine consistency. Based upon the model, an uncertainty analysis is made using a Monte Carlo technique for inversion of the model. The result is an estimate of the hydrocarbon pore volume of the thinly bedded reservoir interval with distribution statistics representing the expected value and the uncertainty in the estimate.

18 Claims, 10 Drawing Sheets

OTHER PUBLICATIONS

Anderson, B., Safinya, K. A., and Habashay, T., 1988, "Effect of Dipping Beds on the Response of Induction Tools", SPE Formation Evaluaiton, Mar. 1988, pp. 29-36.

Arehart, R. A., and Sullivan, K. B., 1996, "Automated Net-to-Gross Cutoffs from Digital Core Images" Formation Evaluation and Reservoir Quality Newsletter (Winter, 1996) pp. 151-153.

Beck, G. F., 1995, "Foreward Modeling of Deep Resistivity Response in Norphlet Wells", Proceeding of SPWLA 36th Annual Symposium, Paper HHH, Jun. 26-29, 1995, pp. 1-12.

Brackett, R. A., 1996, "Direct Digital Core Imaging: An Evaluation of Available Products", Formation Evaluation and Reservoir Quality Newsletter (Summer, 1996) vol. 27, pp. 3-4.

Brackett, R. A., 1996, "Flip/Frac View: Error in Dip Determination from Borehold Images", Formation Evaluation and Reservoir Quality Newsletter (Summer, 1996) vol. 27, pp. 15-17.

Brackett, R. A., 1997, "ImageLog for Sand Volume Determination: An Evaluation", Formation Evaluation and Reservoir Quality Newsletter (Winter, 1997), vol. 28, pp. 31-34.

Brackett, R. A., 1997, "A Checklist for Obtaining Useful Digital Core Images on Photo CDs", Formation Evaluation and Reservoir Quality Newsletter (Winter, 1997), vol. 28, pp. 35-36.

Brackett, R. A., Friedmann, S. J., and Haro, J. E., 1996, "Comparison of Core Images from Kodak DCS 460C Digital Camera and Traditional Photography", Formation Evaluation and Reservoir Quality Newsletter (Summer, 1996), vol. 27, pp. 7-14.

Brackett, R. A., Lukas, T. C., and Arehart, R. A., 1997, "Automated Texture-Based Classification of Image Data Using QBIC (Query by Image Content)", Formation Evaluation and Reservoir Quality Newsletter (Winter, 1997), vol. 28, pp. 37-45.

Brackett, R. A., and Sullivan, K. B., 1996, "Digital Core Data Quality and Calibration: Implications in Thinly Bedded Reservoirs", Formation Evaluation and Reservoir Quality Newsletter (Winter, 1996) pp. 129-136.

Campbell, C. V., 1967, "Lamina, Laminaset, Bed and Bedset", Sedimentology, v. 8, pp. 7-26.

Chemali, R., Gianzero, S., and Su, S. M., 1987, "The Effect of Shale Anistrophy on Focused Resistivity Devises", SWLA 28th Annual Logging Symposium, London, Paper H, pp. 1-23.

Chew, W., Barone, S., Anderson, B., and Hennessy, C., 1984, "Diffraction of Axisymmetric Waves in a Borehole by Bed Boundary Discontinuities", Geophysics, v. 9, No. 10, pp. 1586-1595.

Hornby, B. E., Schwartz, L. M. and Hudson, J. A., 1993, "Effective Medium Modeling of the Electrical and Elastic Properties of Anisotropic Porous Media", SEG 63$^{rd}$ Annual Meeting, Washington, D.C., Sep. 26-30, 1993, pp. 786-791.

Dunsmuir, J., Shafer, J., and Thomman, H., 1997, "3-D Imaging of Pore Fluids Distributions in Chad Rock Using High Resolution X-Ray CT", Formation Evaluation and Reservoir Quality Newsletter (Winter, 1997), vol. 28, pp. 111-115.

Eubanks, D. L., and Moustafa, O., 1997, "Characterization of Low-Contrast/Low-Resistivity Reservoirs with Modern Imaging Tools: Example from the Gulf of Mexico", AAPG Annual Convention, Apr. 6-9, 1997, Dallas, TX, vol. 81, p. 1.

Frodensen, E. W., and Lawrence, T., 1997, "Low-Resistivity, Low-Contrast Pay: Some Examples from Offshore North West Java", Ardjuna Basin, Indonesia, AAPG Annual Convention, Apr. 6-9, 1997, Dallas, TX, vol. 81, p. 1.

Galford, J. E., Flaum, C., Gilchrist, W. A., and Duckett, S. W., 1986, "Enhanced Resolution Processing of Compensated Neutron Logs", 61$^{st}$ Ann. Tech. Conference of SPE, paper 15541.

Galway, R., 1997, "Netting and the Integration of Log, Core, and Test Data", Formation Evaluation and Reservoir Quality Newsletter (Winter, 1997), vol. 28, pp. 47-49.

Herrick, D. C., and Kennedy, W. D., 1996, "Electrical Properties of Rocks: Effects of Secondary Porosity, Laminations, and Thin Beds", SPWLA 37$^{th}$ Annual Symposium, Paper C, pp. 1-11.

Katahara, K. W., 1995, "Gamma Ray Log Response in Shaly Sands", The Log Analyst, v. 36, No. 4, pp. 50-55.

Looyestijn, W. J., 1982, "Deconvolution of Petrophysical Logs: Applications and Limitations", SPWLA, 23$^{rd}$ Annual Logging Symposium, Jul. 6-9, 1982, Paper W, pp. 1-20.

Lukas, T. C., 1997, SPE Forum "Applications of Borehole Imaging Technologies", Jul. 7-12, 1996, Formation Evaluation and Reservoir Quality Newsletter, vol. 28, pp. 147-152.

McCoy, D. D. and Grieves, W. A., 1997, "Use of Resistivity Logs To Calculate Water Saturation at Prudhoe Bay", SPE Reservoir Engineering, February, pp. 45-51.

Moran, J. H., and Gianzero, S., 1979, "Effects of Formation Anisotropy of Resistivity Logging Measurements", Geophysics, v. 44, No. 7, pp. 1266-1286.

Mullarkey, J. C., and Dolly, E. D., 1997, "Causes of Low Contrast, Low Resistivity in Hydrocarbon Productive Reservoirs of the Rocky Mountain and Mid-Continent Regions", AAPG Annual Convention, Apr. 6-9, 1997 Dallas, TX, 1 p.

Murtha, J. A., 1997, "Monte Carlo Simulation: Its Status and Future", Journal of Petroleum Technology, April, pp. 361-373.

Pepper, C. F., and Reedy, G. K., 1996, "Analysis of Laminated Turbidities Using the Bimodal Sand Quality Model (Model Application)", Formation Evaluation and Reservoir Quality Newsletter (Winter, 1996) pp. 87-91.

Poupon, A., Loy, M. E., and Tixier, M. P., 1954, "A Contribution to Electrical Log Interpretation in Shaly Sands", Journal of Petroleum Technology, Jun. 1954, v. 6, No. 6, pp. 27-34.

Reedy, G. K., and Pepper, C. F., 1996, "Analysis of Laminated Turbidities Using the Bimodal Sand Quality Model (Model Development)", Formation Evaluation and Reservoir Quality Newsletter (Winter, 1996) pp. 79-85.

Serra, O., and Andreani, M., 1991, "Thin Beds- A Guide to Interpretation of Thinly Layered Reservoirs", Schlumberger, 82 p.

Sneider, R. M., and Kulha, J. T., 1997, "Low Resistivity, Low Contrast Pays", 1997 AAPG Annual Convention, vol. 81, Apr. 6-9, 1997, Dallas, TX, 1 p.

Sullivan, K. B., and Brackett, R. A., 1996, "Repeatability in Net-to-Gross from Core Images: The Human Factor", Formation Evaluation and Reservoir Quality Newsletter (Winter, 1996) pp. 137-149.

Sullivan, K. B., Brackett, R. A., and Albertin, S. J., 1996, "Net-to-Gross from FMI: A High-Resolution Comparison to Core", Formation Evaluation and Reservoir Quality Newsletter (Winter, 1996) pp. 155-169.

Sullivan, K. B., and Yin, H., 1997, "SHARP™ and "Not-So-SHARP": Two Examples of 1D Resistivity Models", Formation Evaluation and Reservoir Quality Newsletter (Winter, 1997) vol. 28, pp. 99-103.

Tsang, L., Chan, A. K., and Gianzero, S., 1984, "Solution of the Fundamental Problem in Resistivity Logging With a Hybrid Method" Geophysics, v. 49, No. 10, pp. 1596-1604.

Van Wagoner, J., Mitchum, R., Campion, K., and Rahmanian, V., 1990, "Siliciclastic Sequence Stratigraphy in Well Logs, Cores, and Outcrops: Concepts for High-Resolution Correlation of Time and Facies", AAPG Methods in Exploration Series, No. 7., 55 pgs.

Wahl, J. S., 1983, "Gamma-Ray Logging", Geophysics, v. 48, No. 11, pp. 1536-1550.

Yin, H., 1996, "The Use of Resistivity Micro-Probe and its High-Resolution Profile for Forward Modeling", Formation Evaluation and Reservoir Quality Newsletter (Winter 1996) pp. 103-109.

Yin, H., 1996, "In-House Resistivity Modeling—Where Are We Now?", Formation Evaluation and Reservoir Quality Newsletter (Winter 1996) pp. 111-121.

Yin, H., 1997, "Resolving Differences Between LWD and Wireline Resistivity Data by DLL 2-D Modeling", Formation Evaluation and Reservoir Quality Newsletter (Winter 1997) vol. 28, pp. 87-91.

Yin, H., and Sullivan, K. B., 1997, "Dual Laterolog (DLL) 2-D Modeling", Formation Evaluation and Reservoir Quality Newsletter (Winter 1997) vol. 28, pp. 93-97.

Van den Berg, F. et al, "Sandwich: Log Evaluation in Laminated Shaly Sands", SPWLA 37$^{th}$ Annual Logging Symposium, Jun. 16-19, 1996, Paper BB, 12 pgs.

Tarantola, A., 1987, "Inverse Problem Theory: Methods for Data Fitting & Model Parameter Estimation", pp. 167-185.

Mendelson, K. S. and Cohen, M. H., 1982, "The Effect of Grain Anisotropy on the Electrical Properties of Sedimentary Rocks", Geophysics, vol. 47, No. 2, Feb. 1982, pp. 257-263.

European Search Report dated Aug. 18, 2005, (4 pages).

* cited by examiner

| Bed Type Parameters | Bed Types | | | Interval Values | |
|---|---|---|---|---|---|
| | HiQ Sand | LoQ Sand | Shale | Sand | Total |
| $\phi_t$ (total porosity) | 0.30 | 0.25 | 0.25 | 0.28 | 0.24 |
| $S_{wt}$ | 0.15 | 0.35 | 0.35 | 0.22 | 0.36 |
| m (cementation exponent) | 2.00 | 1.80 | 1.80 | | |
| n (saturation exponent) | 2.00 | 2.00 | 2.00 | | |
| aspect ratio | 0.00 | 0.00 | 0.00 | | |
| volume fraction | 0.45 | 0.26 | 0.26 | | |
| HPV (feet) | 3.50 | 1.29 | 1.29 | 4.79 | 4.79 |

| Other Parameters | |
|---|---|
| $C_W$ (mmho/m) | 1000 |
| angle (degrees) | 0 |
| interval thickness (ft) | 30.5 |

*FIG. 6*

| VLSA Step 1 | Bed Type Inputs | | | Averages | | Log Inputs | | REL ERROR |
|---|---|---|---|---|---|---|---|---|
| | HiQ Sand | LoQ Sand | Shale | Sand | Total | Mean | StdDev | |
| PHIT | 0.300 | 0.250 | 0.150 | 0.278 | 0.242 | | | |
| $S_{wt}$ | 0.150 | 0.350 | 1.000 | 0.228 | 0.364 | | | |
| $S_{wb}$ | 0.000 | 0.000 | 0.000 | 0.000 | 0.000 | | | |
| m | 2.00 | 1.80 | 1.80 | 1.91 | 1.86 | | | |
| n | 2.00 | 2.00 | 2.00 | 1.86 | 1.66 | | | |
| rhoma | 2.650 | 2.650 | 2.620 | 2.650 | 2.640 | | | |
| rhof | 0.850 | 0.850 | 1.000 | 0.850 | 0.876 | | | |
| GR | 25 | 40 | 100 | 32 | 53 | 53 | 10 | -0.05 |
| RHOB | 2.110 | 2.200 | 2.377 | 2.149 | 2.214 | 2.214 | 0.01 | -0.02 |
| $C_t$ | 20 | 101 | 329 | 55 | 133 | 133 | 5 | 0.01 |
| Aspect | 0.0001 | 0.0001 | 0.0001 | | | | | |
| frac | 0.405 | 0.311 | 0.284 | 2.149 | 1.000 | | MSE: 0.001 | |
| HPV (ft) | 3.148 | 1.542 | 0.000 | 4.690 | 4.690 | | MAXABS: 0.049 | |

| Other Parameters | | | LAYOUT MODEL | Cell Definitions | |
|---|---|---|---|---|---|
| $C_{wf}$ | 10000 | | | *nnn* | Input field |
| $C_{wb}$ | 10000 | | | nnn | Computed value |
| angle | 0.0 | | SOLVE VOLUMES | *nnn* | Solver solution (or manual input) |
| h (ft) | 30.5 | | | | |

*FIG. 7*

| Parameter | | Step 1 Value | Input: StdDev | AMin | BMin | Input: Min | Input: Max |
|---|---|---|---|---|---|---|---|
| $C_{wf}$ | | 10000 | 100 | 2.00 | 2.00 | 9800 | 10200 |
| $C_{wb}$ | | 10000 | 100 | 2.00 | 2.00 | 9800 | 10200 |
| Angle | | 0 | 1.0 | 0.00 | 0.00 | 0.0 | 0.0 |
| h (ft) | | 30.5 | 1.0 | 0.00 | 0.00 | 30.5 | 30.5 |
| frac | HiQ Sand | 0.450 | 1.000 | 0.45 | 0.25 | 0.000 | 0.700 |
| | LoQ Sand | .0260 | 1.000 | 0.26 | 0.44 | 0.000 | 0.700 |
| | Shale | 0.290 | 1.000 | 0.29 | 0.41 | 0.000 | 0.700 |
| Aspect | HiQ Sand | 0.0001 | 1.000 | 0.00 | 0.10 | 0.0001 | 0.1000 |
| | LoQ Sand | 0.0001 | 1.000 | 0.00 | 0.10 | 0.0001 | 0.1000 |
| | Shale | 0.0001 | 1.000 | 0.00 | 0.10 | 0.0001 | 0.1000 |
| PHIT | HiQ Sand | 0.300 | 0.010 | 2.00 | 2.00 | 0.280 | 0.320 |
| | LoQ Sand | 0.250 | 0.010 | 2.00 | 2.00 | 0.230 | 0.270 |
| | Shale | 0.150 | 0.010 | 2.00 | 2.00 | 0.130 | 0.170 |
| $S_{wt}$ | HiQ Sand | 0.150 | 1.000 | 0.10 | 0.15 | 0.050 | 0.300 |
| | LoQ Sand | 0.350 | 1.000 | 0.10 | 0.10 | 0.250 | 0.450 |
| | Shale | 1.000 | 1.000 | 0.00 | 0.00 | 1.000 | 1.000 |
| $S_{wb}$ | HiQ Sand | 0.000 | 1.000 | 0.00 | 0.00 | 0.000 | 0.000 |
| | LoQ Sand | 0.000 | 1.000 | 0.00 | 0.00 | 0.000 | 0.000 |
| | Shale | 0.000 | 1.000 | 0.00 | 0.00 | 0.000 | 0.000 |
| m | HiQ Sand | 2.00 | 0.07 | 2.86 | 2.86 | 1.80 | 2.20 |
| | LoQ Sand | 1.80 | 0.07 | 2.86 | 2.86 | 1.60 | 2.00 |
| Ct | Shale | 329 | 100 | 0.20 | 0.20 | 309 | 349 |
| n | HiQ Sand | 2.00 | 0.07 | 2.86 | 2.86 | 1.80 | 2.20 |
| | LoQ Sand | 2.00 | 0.07 | 2.86 | 2.86 | 1.80 | 2.20 |
| | Shale | 2.00 | 0.07 | 0.00 | 0.00 | 2.00 | 2.00 |
| rhoma | HiQ Sand | 2.65 | 0.01 | 1.00 | 1.00 | 2.64 | 2.66 |
| | LoQ Sand | 2.65 | 0.01 | 2.00 | 2.00 | 2.63 | 2.67 |
| | Shale | 2.62 | 0.01 | 1.00 | 3.00 | 2.61 | 2.65 |
| rhof | HiQ Sand | 0.85 | 0.01 | 5.00 | 5.00 | 0.80 | 0.90 |
| | LoQ Sand | 0.85 | 0.01 | 5.00 | 5.00 | 0.80 | 0.90 |
| | Shale | 1.00 | 0.01 | 0.00 | 0.00 | 1.00 | 1.00 |
| GR | HiQ Sand | 25 | 10 | 0.50 | 0.50 | 20 | 30 |
| | LoQ Sand | 40 | 10 | 1.00 | 1.00 | 30 | 50 |
| | Shale | 100 | 20 | 0.75 | 0.75 | 85 | 115 |

*FIG. 8*

VLSA Monte Carlo case viewer

| | Bed Type Inputs | | | Averages | | Log Inputs | | PROB. INDEX |
|---|---|---|---|---|---|---|---|---|
| | *HiQ Sand* | *LoQ Sand* | *Shale* | Sand | Total | Mean | StdDev | |
| PHIT | 0.289 | 0.238 | 0.135 | 0.285 | 0.238 | | | |
| $S_{wt}$ | 0.226 | 0.377 | 1.000 | 0.236 | 0.372 | | | |
| $S_{wb}$ | 0.000 | 0.000 | 0.000 | 0.000 | 0.000 | | | |
| m | 2.07 | 1.71 | 1.68 | 2.04 | 1.92 | | | |
| n | 2.01 | 1.91 | 2.00 | 1.96 | 1.58 | | | |
| rhoma | 2.652 | 2.665 | 2.624 | 2.653 | 2.643 | | | |
| rhof | 0.843 | 0.850 | 1.000 | 0.844 | 0.872 | | | |
| GR | 23 | 42 | 96 | 25 | 49 | *53* | *10* | 0.92 |
| RHOB | 2.129 | 2.233 | 2.405 | 2.137 | 2.221 | *2.214* | *0.01* | 0.76 |
| $C_t$ | 38 | 134 | 344 | 45 | 132 | *133* | *5* | 0.99 |
| Aspect | 0.0439 | 0.0439 | 0.0439 | | | | | |
| frac | 0.633 | 0.052 | 0.315 | 0.685 | 1.000 | | | |
| HPV (ft) | 4.318 | 0.236 | 0.000 | 4.554 | 4.554 | | | |

| Other Parameters | |
|---|---|
| $C_{wf}$ | 9962 |
| $C_{wb}$ | 9853 |
| angle | 0.0 |
| h (ft) | 30.5 |
| Trial no. | *492* |
| of total: | 1000 |

| Joint PI | 0.70 |
|---|---|
| Cases | 7 |

| Cell Definitions | |
|---|---|
| *nnn* | Selected case no. |
| *nnn* | From Step 1 |
| nnn | Case value |
| nnn | Computed value |

*FIG. 10*

VOLUMETRIC LAMINATED SAND ANALYSIS

This application claims the benefit of U.S. Provisional Application No. 60/265,659 filed Jan. 31, 2001.

BACKGROUND OF THE INVENTION

This invention relates generally to methods for analyzing data obtained from well logs to determine the hydrocarbon pore volume of a subsurface geological formation. More specifically, this invention relates to an analysis of well log data taken in a reservoir having thinly interbedded sandstone and shale layers.

An estimate of the hydrocarbon pore volume (HPV) of a subsurface geological formation has been obtained by the analysis of well log data obtained from an exploration well penetrating the formation. A well log generally involves the recording of a series of measurements obtained while an instrument traverses the formation through a wellbore. Such measurements are recorded in correlation with uniform depth increments. The well logging instruments produce measurements that represent an average of the measured rock property over a finite length of the wellbore which typically is about three to six feet. The various types of well logging instruments commonly used make measurements based on electrical, acoustic, and nuclear properties of the formation.

In reservoirs where sand and shale are interbedded at bed thicknesses of two feet or less, the vertical resolution limits of the well logging instruments result in HPV estimates being too low. Accordingly, there is a significant risk that economically significant hydrocarbon reserves may be overlooked. Also, if an induction-logging instrument is used to make electrical resistivity measurements in a thinly bedded reservoir, the resistivity measurement becomes less sensitive to the hydrocarbon saturation in the sandstone layers and more sensitive to the proportion of shale. As a consequence, there is less certainty in the estimate of HPV in thinly bedded reservoirs.

Heretofore, two general approaches have been developed to seek more accurate estimates of HPV from well log data obtained in thinly bedded reservoirs. One approach is referred to as "high-resolution," and the other approach is referred to as "low-resolution." The high-resolution approach seeks to enhance the vertical resolution of the logging instruments used. The vertical resolution of a logging instrument refers to the thinnest bed in which a true reading can be obtained. The low-resolution approach seeks to determine the relationship between HPV and averaged well log data over a gross formation interval (e.g., 10 feet or more in thickness) so as to obviate having to resolve accurate log data values in individual thin beds.

The essential element of the low-resolution approach is in establishing the relationship within overall interval conductivity of sand layer conductivity and shale layer conductivity. In the simplest case, this relationship can be expressed as: $C_{int} = h_{sand} \times C_{sand} + h_{shale} \times C_{shale}$, where $C_{int}$, $C_{sand}$, and $C_{shale}$ are the interval, sand, and shale conductivities, respectively; and $h_{sand}$ and $h_{shale}$ are, respectively, the fractional sand and shale thickness within the interval of interest, with $h_{sand} + h_{shale} = 1$. The interval may be the resolution interval of the resistivity log or may be a larger reservoir interval. Similar equations, well known to those skilled in the art, exist for associated logs such as density, neutron porosity, and gamma ray, which may be used in the estimation of interval hydrocarbon pore volume. Illustrative of the prior art implementations of the low resolution approach are Hagiwara, U.S. Pat. No. 4,739,255, and Frans G. Van den Berg et al., "Sandwich: Log Evaluation In Laminate Shaly Sands," SPWLA 37th Annual Logging Symposium, Jun. 16-19, 1996.

Also, even though thinly bedded sandstone formations have historically been called shaly sands in the petrophysical literature, standard shaly sand log analysis techniques do not correctly account for the effect of thin bedding on log responses. The standard shaly sand log analysis techniques were developed to address the effects of dispersed clay in sandstone rather than macroscopically interbedded sands and shales. The electrical effects of these two modes of clay or shale distribution are significantly different, and therefore, different log analysis techniques are required to correctly analyze each mode.

SUMMARY OF THE INVENTION

The present invention provides a low-resolution approach for thin bed analysis, which will be referred to herein as Volumetric Laminated Sand Analysis ("VLSA"). The approach of the present invention provides for an analysis of standard well log data obtained in thinly bedded reservoirs to obtain improved estimates of hydrocarbon pore volume. The analysis is applied on the basis that the reservoir formation is constituted by a sequence of approximately parallel, planar beds that are classified into bed types and wherein each bed type can be characterized as to porosity, capillary pressure behavior (i.e., water saturation), and aspect ratio. In applying the analysis, an initial geological formation model (including bed types, bed properties, and bed frequencies) is produced for a subject well and consistent with its measured log data. Thereafter, a Monte Carlo inversion is performed to find the resultant probability distribution of HPV.

In accordance with the VLSA methodology, the initial earth model is obtained by specifying the analysis interval of the thinly bedded reservoir and specifying a set of bed types (e.g., sandstone beds and shale beds) believed to constitute the analysis interval. For each bed type, estimates are made of the average values of the relevant petrophysical properties (e.g., porosity, water saturation, and thickness within the interval), aspect ratio, and any other parameter as may be desired based on core data or regional knowledge. Estimates are made of the frequency of occurrence of the different bed types, which may be estimated from conventional or high-resolution logs or from core image analysis. These estimates are combined, using appropriate theoretical models, to produce estimates for the average log values over the analysis interval. Averages of the actual log measurements are computed over the analysis interval. The estimated log measurements are compared to the actual log measurements to ascertain consistency. The model continues to be refined by modifying the parameters until a model is found which is consistent with the measured log data.

In the Monte Carlo inversion, a random earth model is generated consisting of independent random samples from the estimated probability distribution for all of the petrophysical parameters describing the initial model. Estimated log responses are calculated for this random earth model. The estimated log responses are compared to the measured log responses to determine consistency. If estimated and measured logs are consistent, the random earth model is retained. The Monte Carlo model continues to be refined by repeating the procedure over a predetermined number of trial cases. From the various retained cases, distribution statistics are computed for interval HPV and related parameters (e.g., sand porosity, sand water saturation, net-to-gross ratio). The distribution statistics represent the expected value and uncertainty in HPV associated with the average measured log values over the thinly bedded reservoir interval.

Among the advantages of the VLSA methodology over the high-resolution approach and prior low-resolution approaches is that thin-bed effects on all required logs, and not just resistivity logs, can be taken into account. Also, the VLSA methodology accounts for the effect on the resistivity log of bedding units or inclusions with large aspect ratios (e.g., discontinuous beds or shale clasts). Further, in contrast to the high-resolution approach wherein new random uncertainty is introduced at each log depth, the VLSA methodology reduces such random uncertainty by consolidating data from multiple depths.

Among the additional advantages of the VLSA methodology over prior low-resolution approaches is that deterministic, potentially unstable methods for calculating sand conductivity are not used. An example of such a potentially unstable method is the algebraic solution of the equation for interval conductivity set forth above. Instead, a completely general solution technique is used that provides stable solutions and uncertainty assessments over the complete range of shale fractions. The general solution technique extracts information on shale fraction from all available logs, while also integrating any a priori information on shale fraction such as that obtained from a high-resolution image log. This avoids use of a pre-defined and limited set of log measurements (e.g., gamma ray, density, neutron porosity) to estimate the critical shale fraction parameter.

BRIEF DESCRIPTION OF THE DRAWINGS

FIG. 6 is a tabulation of the formation data that summarizes the known petrophysical properties of the synthetic formation used to illustrate the VLSA methodology;

FIG. 7 is the model setup worksheet for an EXCEL® workbook implementation of the VLSA methodology, as applied to the illustrative example that is the subject of FIGS. 5 and 6;

FIG. 8 illustrates the model setup worksheet, applicable to the illustrative example of FIGS. 5, 6, and 7, for specifying the a priori distributions of the VLSA model input parameters in the form of a bounded normal distribution;

FIG. 10 illustrates a worksheet for viewing the parameters and calculated values from any one successful Monte Carlo trial.

DETAILED DESCRIPTION OF A PREFERRED EMBODIMENT

Introduction

Figure 1:
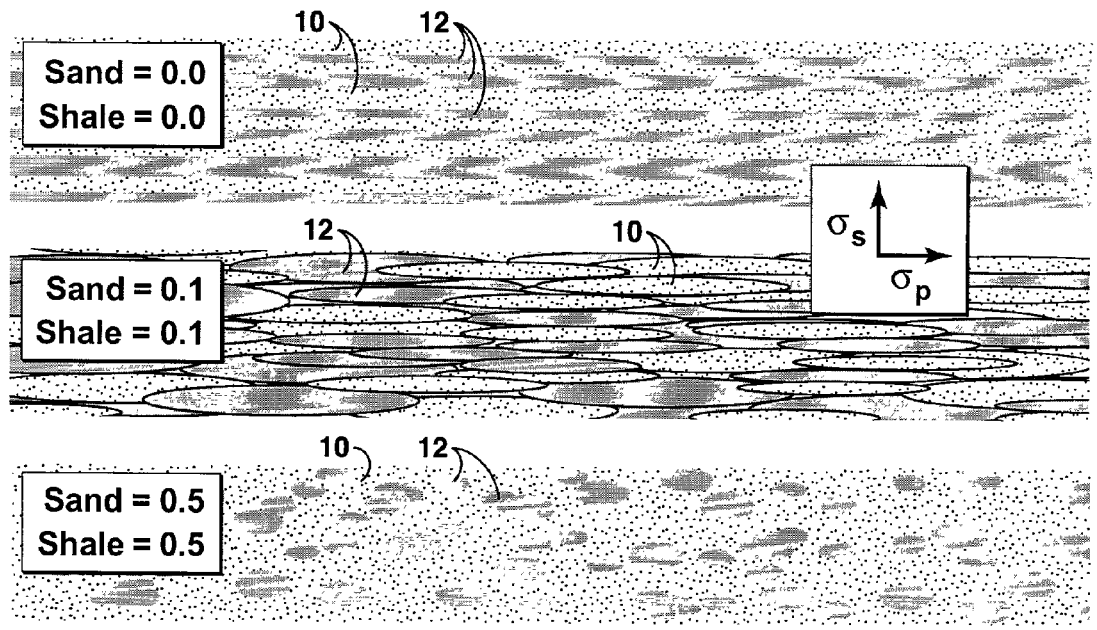
FIG. 1 illustrates sand-shale formations having two end-member bed types (sandstone and shale) and bed aspect ratios varying from 0.0 to 0.5.

Prior to describing the VLSA methodology, certain basic principles of log analysis will be described. Petrophysical properties are intrinsic properties of a volume of rock, which have well-defined values independent of measurement techniques. These properties may be isotropic (i.e., independent of orientation) or anisotropic (value depends on orientation within the rock volume). Examples of isotropic petrophysical properties are total porosity and water saturation. Examples of anisotropic properties are conductivity, acoustic velocity, and permeability. In idealized cases, the isotropic petrophysical properties of a thin-bedded rock volume can be inferred from the corresponding properties of the individual beds via simple averaging relationships known to those skilled in the art. For anisotropic properties, such relationships are more complex.

Log responses are estimates of petrophysical properties as measured by well logging tools. These responses depend in a complex way on the geometries of the tool and the borehole environment. In most cases, however, thin-bed log response can be adequately approximated using the idealized physical averaging relationship that applies to the underlying petrophysical property. All of the thin-bed log analysis techniques based on conventional logs use these simplified averaging relationships. The types of petrophysical averaging relationships include simple volume-weighted averages of isotropic properties (e.g., total porosity, total water saturation, bulk density, and matrix density); mass-weighted averages of isotropic properties (e.g., gamma ray); and orientation dependent averages of anisotropic properties (e.g., conductivity).

Certain terminology also applies to the expression of relationships between petrophysical properties and the composite properties of thinly bedded formations measured at a scale greater than or equal to log resolution. These definitions refer to a fixed volume "V" of the thin-bed formation. The fixed volume V may represent an interval of core, a cylinder around the wellbore of given radius and height, or the investigation volume of a given logging tool. A thin-bed property "P" is the value of a petrophysical property or log response measured as an average over the total fixed volume. An end member property "$P_i$" is the value of a petrophysical property measured over that fraction of the fixed volume composed of a given end member rock type (the i-th rock type). The volume fraction "$V_i$" of the i-th end member is the ratio of the volume of that end member to the fixed total volume (pore space included). If there are N end members in a given sample, the volume fractions satisfy the equation: $V_1+V_2+\ldots+V_N=1$. The mass fraction "$W_i$" of the i-th end member is the ratio of the mass of that end member to the total mass of the fixed volume (pore space included). If there are N end members in a given sample, the mass fractions satisfy the equation: $W_1+W_2+\ldots+W_N=1$.

Certain equations relating to thin-bed log responses of interest include:

| Bulk Density | $RHOB = V_1 RHOB_1 + V_2 RHOB_2$ |
|---|---|
| Gamma Ray | $GR = W_1 GR_1 + W_2 GR_2$ |

| | |
|---|---|
| Conductivity (parallel) | $C_P = V_1 C_1 + V_2 C_2$ |
| Conductivity (series) | $1/C_S = V_1/C_1 + V_2/C_2$ |

FIG. 1 shows thinly bedded formations with two end member bed types (sand 10 and shale 12). FIG. 1 illustrates beds with a range of aspect ratios, as indicated. Here the aspect ratio is defined as the ratio of bed thickness to bed width, and the beds are idealized as oblate ellipsoidal bodies. An aspect ratio of 0.0 represents parallel, planar beds and an aspect ratio of 1.0 represents approximately spherical inclusions. The average vertical and horizontal conductivity of formations approximated by this idealized structure, which have positive (i.e., non-zero) aspect ratios, can be estimated using effective medium theory (EMT), as expressed in the following set of implicit equations:

$$\sigma_s = \sum_k f_k \sigma_k, \text{ where}$$

$$f_k = \frac{v_k / R_{k,v}}{\sum_i (v_i / R_{i,v})},$$

$$R_{k,v} = 1 + L_{k,v}(\sigma_k / \sigma_s - 1),$$

$$L_{k,v} = (1 + e_k^2)(e_k - \tan^{-1}(e_k))/e_k^3, \text{ and}$$

$$e_k = \left[\left(\frac{\sigma_s}{\sigma_p}\right)\alpha_k^2 - 1\right]^{1/2}.$$

$$\sigma_p = \sum_k g_k \sigma_k, \text{ where}$$

$$g_k = \frac{v_k / R_{k,h}}{\sum_i (v_i / R_{i,h})},$$

$$R_{k,h} = 1 + L_{k,h}(\sigma_k / \sigma_p - 1), \text{ and}$$

$$L_{k,h} = (1 - L_{k,v})/2.$$

Inputs to these equations are the following terms:
  $\alpha_k = 1/$(aspect ratio of bed type k),
  $\sigma_k =$ conductivity of bed type k, and
  $v_k =$ volume fraction of bed type k.

Outputs from these equations, which can be obtained by a recursive computation, are the conductivities parallel and transverse to the major axes of the ellipsoids, $\sigma_p$ and $\sigma_s$, respectively. In the case of parallel planar beds (i.e., beds having an aspect ratio of zero), these correspond to the ordinary parallel and series conductivities and the EMT equations reduce to the equations given above for parallel and series conductivity of parallel planar beds.

Figure 2:
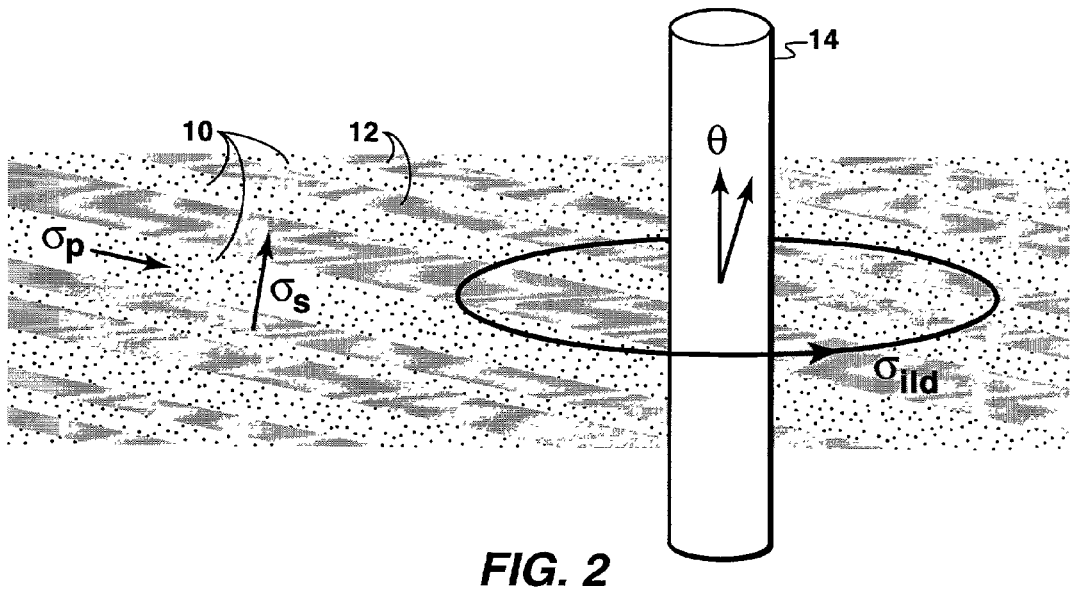
FIG. 2 illustrates a borehole penetrating a series of approximately parallel, planar beds.

FIG. 2 illustrates parallel planar sand and shale beds 10 and 12 dipping with respect to a borehole 14, with relative dip angle theta ($\theta$). In this situation, for beds of any aspect ratio, the average conductivity measured by an induction log ($\sigma$ild) is:

$$\sigma_{ild} = [\sigma_p^2 \cos^2(\theta) + \sigma_p \sigma_s \sin^2(\theta)]^{1/2}$$

Volumetric Laminated Sand Analysis (VLSA)

The VLSA methodology provides for analyzing standard well log data from thinly bedded reservoirs to obtain unbiased estimates of hydrocarbon pore volume. The method provides for incorporating all known information about the reservoir's petrophysical properties (e.g. porosity, water saturation, net sand thickness) into the log analysis. The method also provides for incorporating information on the average aspect ratios of the sand and shale beds. In addition, the method estimates the inherent uncertainty in the estimated hydrocarbon pore volume and in the associated reservoir parameters (net-to-gross ratio, porosity, and water saturation).

Figure 3:
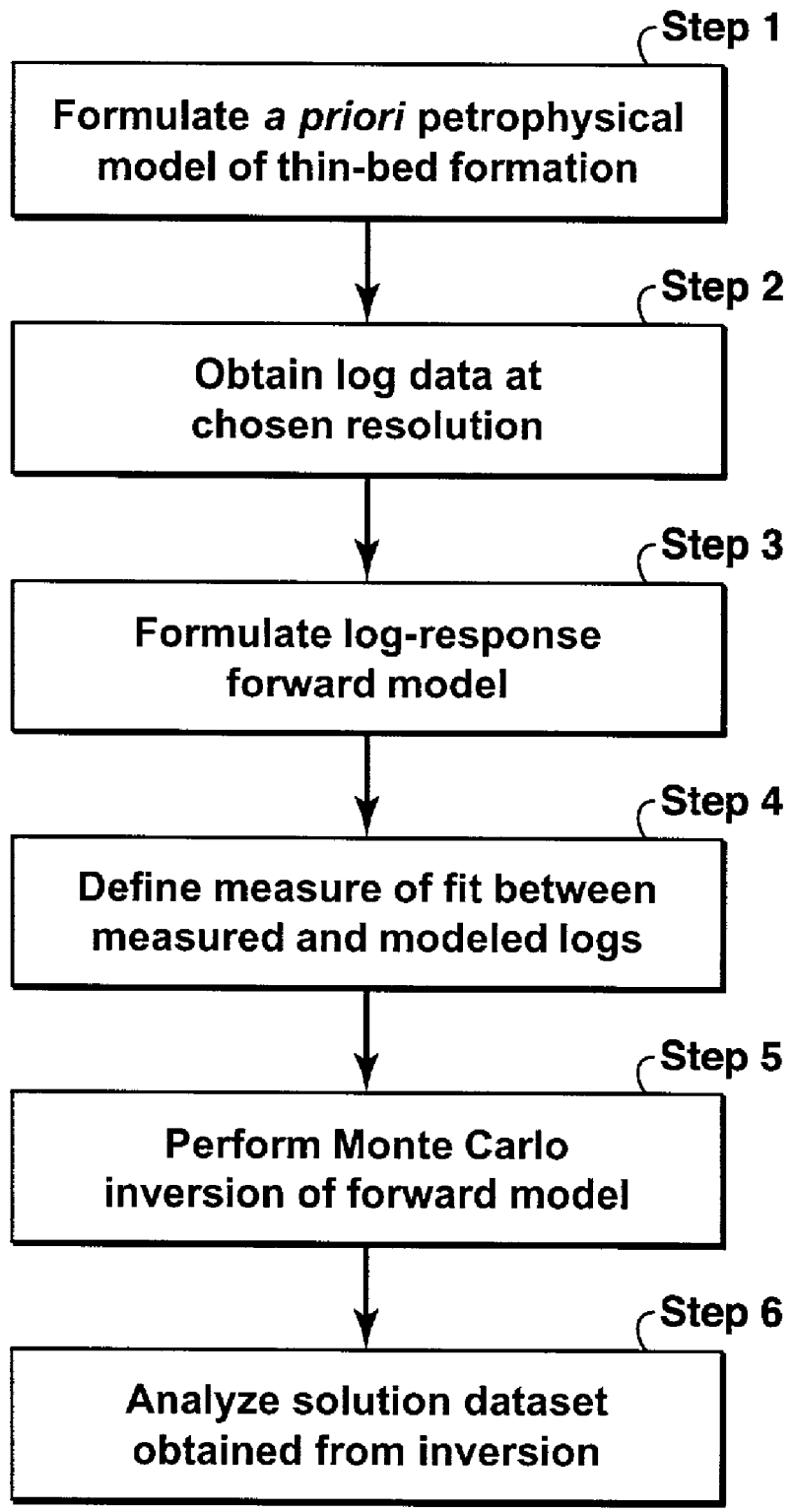
FIG. 3 illustrates the principal steps of the VLSA methodology.

FIG. 3 illustrates the principal steps of the VLSA methodology in its most generic form. The steps outlined in FIG. 3 are described in more detail below.

Step 1: Formulate a priori petrophysical model of thin-bed formation.
  a. In a subject well, identify the top and bottom of the thinly bedded reservoir interval that is to be analyzed.
  b. Identify a set of bed-types (an earth model) which are assumed to comprise the thinly bedded reservoir interval.
  c. For each bed-type, establish a priori probability distributions describing the possible ranges of porosity, water saturation, relative thickness of the bed-type within the composite interval, aspect ratio of the bed type, and such other parameters as may be required to calculate the theoretical response of each log measurement to that bed-type. In establishing these a priori distributions, all available auxiliary data may be employed (including, but not limited to, core measurements of porosity, water saturation, and capillary pressure, and estimates of bed-type relative thickness based on high-resolution image logs, core descriptions, digital analysis of core photographs, or results of standard log analysis in adjacent thickly bedded intervals).
  d. The petrophysical model space, M, is the vector space consisting of all possible combinations of values of the parameters identified in step c. If the number of parameters is N, then M is an N-dimensional space.

Step 2: Obtain log data at chosen resolution.
  a. Select the well log measurements that are to be used to constrain the determination of hydrocarbon pore volume for the subject interval. This set of measurements must include a deep-reading conductivity log and may include any or all of the other log measurements normally run for this purpose. The log-data space, D, is the vector space of all possible combinations of these log values. If there are P logs, then D is a P-dimensional space
  b. Select one of two resolution modes (i or ii below) for the analysis and apply linear filters to all logs to bring them into consistency with the selected resolution mode.
    i) Total-interval resolution mode. In this mode, a single solution is obtained for the hydrocarbon pore volume of the identified reservoir interval. Each log is "filtered" by calculating its average value over the interval. The set of average log values is represented by one vector d in the log-data space, D.
    ii) Resolution adjusted to match the lowest-resolution log. In this case, appropriate linear filters are applied to each log so the filtered logs are all resolution-matched to the lowest-resolution log. Each logged depth is represented by a separate vector in the log-data space, D.

Step 3: Formulate log-response forward model. For each selected well log type, formulate a theoretical predictor ("forward model") that predicts the measured log value for each point in the petrophysical model space, M. In general, this formulation proceeds in two steps: a first equation or algorithm predicts the log value within each of the bed types; and a second equation or algorithm predicts the log value resulting from the interlayering of all the bed types defined in the petrophysical model. As an example, the conductivity log is discussed below. Other log types would proceed in a similar manner.

a. Conductivity within each bed type. There are several well-known equations that may be used to predict conductivity of a homogeneous, electrically isotropic rock with known petrophysical parameters. These include the Archie, Waxman-Smits, or Dual Water equations, all of which are familiar to those skilled in the art of log analysis.

b. Conductivity of interlayered thin beds. Equations describing the average induction-log conductivity as a function of the conductivities and relative frequencies of the bedding units are described above. These equations account for the effect of beds dipping relative to the wellbore, and the effect of beds with finite aspect ratio.

Step 4: Define measure of fit between measured and modeled logs. Define a function which measures the closeness of fit between two vectors (a measured point $d_1$ and a predicted point $d_2$) in the log-data space, D. The measure function can be written $e(d_1,d_2)$. An example of such a function is the joint probability index:

$$e(d_1, d_2) = \prod_k \exp(-0.5((d_{1,k} - d_{2,k})/std_k)^2)$$

In this equation, $d_{1,k}$ and $d_{2,k}$ are the k-th of P well log values belonging to the measured and predicted log vectors $d_1$ and $d_2$ respectively, and $std_k$ is the corresponding standard deviation which represents the combined measurement and model error for the k-th log. The joint probability index is proportional to the probability that $d_1$ equals $d_2$, assuming that the combined measurement and model errors are distributed normally for each log and are independent between logs.

Figure 4:
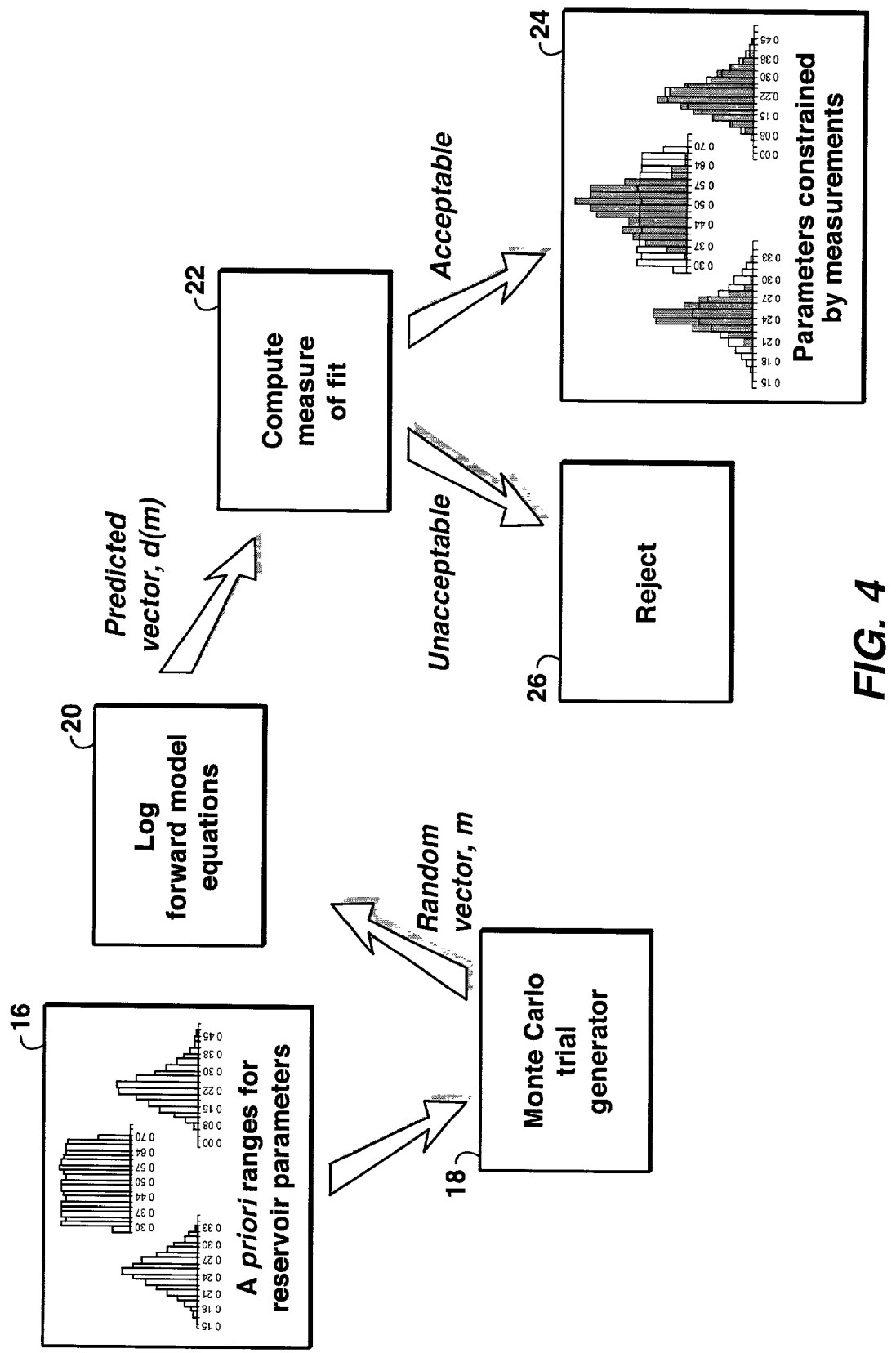
FIG. 4 illustrates the Monte Carlo inversion procedure used in the VLSA methodology.

Step 5: Perform Monte Carlo inversion of forward model. Inversion is performed for each measured data-point d in the log-data space (see step 2). Inversion consists of the following steps, which are illustrated in FIG. 4.

a. Using the a priori distributions 16 established in step 1c, the Monte Carlo trial generator 18 generates a random vector, m, in model space, M.

b. Apply the log forward model equations 20 to the model vector m, obtaining a predicted vector d(m) in log data space, D.

c. Compute the measure of fit e(d, d(m)) between measured and predicted log vectors (reference numeral 22).

d. Keep (reference numeral 24) or reject (reference numeral 26) the model vector m using a rule based on the measure of fit e(d, d(m)). As an example of such a rule, if e(d, d(m)) is defined as in the equation in step 4 above, then m may be recorded in the solution dataset, S, with a frequency N ranging from 0 to 10 given by:

$$N = \text{round}(10 \cdot e(d, d(m)))$$

e. Steps a-d are repeated for a prescribed number of trials, or until the solution dataset S reaches a prescribed minimum size.

Step 6: Analyze solution dataset obtained from inversion. The solution dataset, S, represents a random sample drawn from the a posteriori probability distribution of petrophysical models; that is, the distribution of models that is possible after taking into account the constraints imposed by the well log data. Thus S can be used to calculate standard statistical measures of central tendency and dispersion of the hydrocarbon pore volume and its components (net-to-gross, porosity, and water saturation). These measures of dispersion represent the uncertainty inherent in estimating hydrocarbon pore volume from well log data in thinly bedded reservoirs. As an example, the median (50th percentile statistic) may be used as a measure of the most likely hydrocarbon pore volume, while the 10th percentile and 90th percentile may be used to describe the range of possible values.

The solution dataset, S, may also be used to examine correlation among model variables to evaluate the sensitivity of hydrocarbon pore volume (and related parameters) to other model parameters. As an example, it is often found that the hydrocarbon pore volume depends sensitively on the assumed value of the shale conductivity. Examination of this sensitivity in the sample dataset can be a useful a posteriori check on the validity of assumptions made in developing the a priori probability distributions (step 1c).

Synthetic Data Interval-Average VLSA Example

Figure 5:
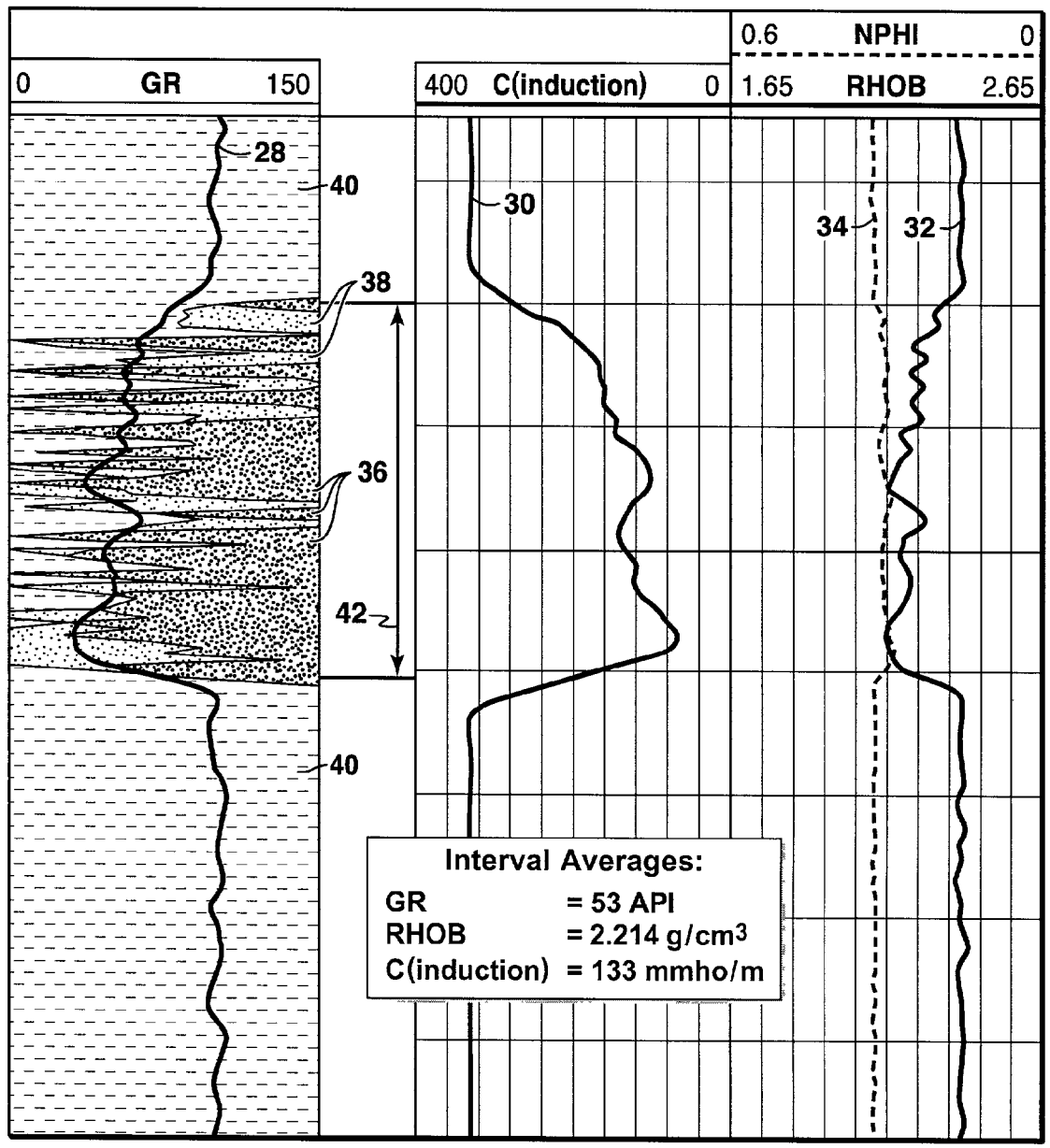
FIG. 5 is a plot of synthetic gamma ray, induction log conductivity, neutron porosity, and bulk density logs for a synthetic formation used to illustrate the VLSA methodology.

A. Model Set-up. In FIG. 5, synthetic gamma ray (GR) 28, induction log conductivity (C(induction)) 30, bulk density (RHOB) 32, and neutron porosity NPHI 34 logs for a synthetic formation are shown. The synthetic formation comprises three, interlayered bed types: a high-quality sandstone 36, a low-quality sandstone 38, and shale 40. The shaded areas in the left-hand column indicate the distribution of high-quality and low-quality sandstone and shale at 0.5 foot resolution. The interval to be analyzed is interval 42, as shown in the second column. The data set tabulated in FIG. 6 shows the petrophysical properties of these bed types, including average total porosity ($\phi_t$), water saturation ($S_{wt}$), cementation exponent (m), saturation exponent (n), aspect ratio, volume fraction, brine conductivity ($C_w$), angle ($\theta$), interval thickness (feet), and hydrocarbon pore volume (feet).

In FIG. 7, a model of the formation based on the illustrative example of FIGS. 5 and 6 is presented in a spreadsheet implementation of the average-interval approach of the VLSA methodology. The model is a starting point for the Monte Carlo analysis. The preferred spreadsheet implementation uses EXCEL® version 5.0 or higher and has the EXCEL SOLVER® installed. The worksheet data includes input petrophysical parameters, input log means and standard deviations, calculated petrophysical averages, and calculated log relative errors and cumulative errors. The bed type fractions and calculated averages represent a base case solution to the thin-bed problem, matching all three log inputs with relative errors less than 1.0 in absolute value. In the model set up, the parameters are as follows:

PHIT=porosity
    $S_{wt}$=total water saturation
    $S_{wb}$=bound water saturation
    m=Archie cementation exponent
    n=Archie saturation exponent
    rhoma=matrix density
    rhof=fluid density
    GR=average gamma ray log values
    RHOB=bulk density ($\rho_b$)
    $C_t$=conductivity
    Aspect=aspect ratio of the bedding units
    frac=bed type fraction
    HPV=hydrocarbon pore volume
    $C_{wf}$=free-water conductivity
    $C_{wb}$=bound-water conductivity
    angle=the relative angle between bedding planes and borehole
    h=thickness of the analysis interval The log responses for each bed type are computed using standard petrophysical relationships as follows:

Bulk density $RHOB=(PHIT \times rhof)+[(1-PHIT)rhoma]$

Conductivity $C_t=[C_{wf}+S_{wb}(C_{wb}-C_{wf})/S_{wt}] \times PHIT^m \cdot S_{wt}^n$ The thin-bed model averages are obtained as described above. Hydrocarbon Pore Volume is computed as: HPV (feet)=h (feet)×PHIT×(1−$S_{wt}$). HPV is the main parameter that is being sought through the VLSA methodology. Log relative errors are computed as (Model average—Input log mean)/Std. Dev. The mean squared error (MSE) is the mean of the squared log relative errors. The maximum absolute error (MAXABS) is the maximum of the absolute values of the log relative errors. If MAXABS is less than one, then all the computed model averages match the input log means to within one standard deviation.

The objective to finding a base-case solution is to adjust bed-type input parameters and volume fractions to achieve a model where MAXABS is less than one. That is, all the predicted logs fit the input logs to within the specified standard deviation tolerances. Bed-type parameters and volume fractions can be adjusted manually to reduce MAXABS and seek a base-case solution. Such adjustments should consider the relative confidence in the different parameters based upon the source. For example, if the average porosity for high-quality sand (HiQ Sand) was obtained from a large core plug database that showed relatively little variation in porosity, then little or no adjustment should be made to that parameter. The focus should be on adjusting those parameters that are known with the least certainty. During the iterative process, EXCEL SOLVER® can be invoked to vary the volume fractions to minimize MSE. If, however, the volume fractions are known with a high degree of confidence, such as from core image analysis, then they should be entered manually and not adjusted. Both manual adjustment and use of EXCEL SOLVER® can be undertaken until an acceptable solution is found. The base-case solution forms the basis for the subsequent Monte Carlo analysis.

The base-case solution for the illustrative example is shown in FIG. 7. This solution was found by using the EXCEL SOLVER® to adjust the volume fractions. It can be seen that this base-case solution comes very close to duplicating the correct formation parameters, which are illustrated in FIG. 6.

B. Monte Carlo Analysis. Monte Carlo analysis is a statistical method that yields probability distributions for unknown parameters. Further details concerning Monte Carlo methods can be obtained by reference to Tarantola, A., "Inverse Problem Theory: Methods for Data Fitting and Model Parameter Estimation," pp. 167-185 (1987). A Monte Carlo analysis begins with a computational model. In the model of present consideration, the accuracy of the input parameters is described in terms of probability distributions. In the Monte Carlo analysis, a single trial consists of randomly selecting one value from the probability distribution for each input parameter and calculating the resulting output. The complete simulation entails performing thousands of trials. For the Monte Carlo analysis specific to VLSA, the result of a given trial is retained only if that trial produces calculated logs that match the input log values within the specified closeness of fit. The results of all the retained trials are stored and analyzed to draw conclusions about the uncertainty in the solution of the original thin-bed problem.

Figure 9:
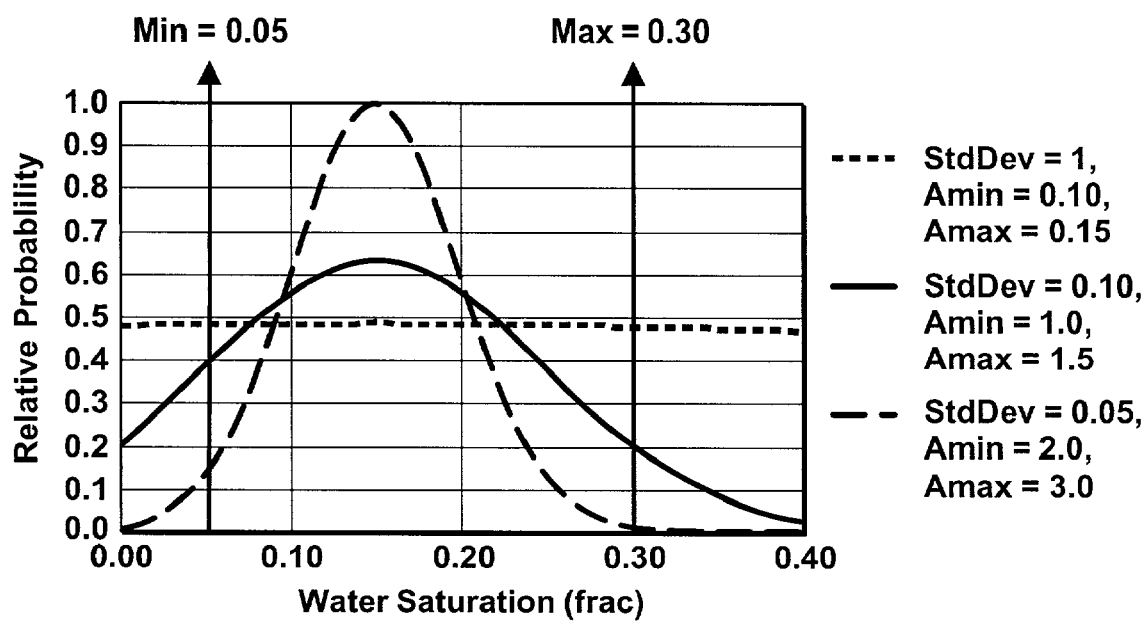
FIG. 9 illustrates the form of the distribution of an interval-average parameter between its minimum and its maximum in relation to total water saturation of high-quality sand.

In the illustrative example, the accuracy of the input parameters for the interval-average VLSA analysis approach is shown in FIG. 8. The parameters in the table of FIG. 8 are from the model setup of FIG. 7. If all the parameters of FIG. 7 were known exactly, then the base-case solution would provide the best and final answer for HPV. However, in practice, there is some uncertainty associated with each parameter. The entries tabulated in FIG. 8 describe the uncertainty of each input parameter in the form of a bounded normal distribution. The numerical entries in the table include the mean values from FIG. 7, the standard deviation (StdDev), minimum value (Min), maximum value (Max). The parameters Amin and Amax are calculated from Min=Mean−Amin×StdDev and Max=Mean+Amax×StdDev. The StdDev value determines how peaked or flat the distribution is between its Min and Max as illustrated in FIG. 9. In general, a parameter that is known with high accuracy is characterized by a narrow, peaked distribution, while a parameter that is less constrained should be characterized by a broad, flat distribution. The values of Amin and Amax represent the number of standard deviations between the mean value and the min and max, respectively. As an example, FIG. 9 shows three possible probability distributions for the total water saturation of high-quality sand parameter.

For the example shown in FIG. 8, the fractions of HiQ Sand, LoQ Sand, and Shale are all assigned uniform (flat) distributions in the range 0.00-0.70, representing a very high level of uncertainty in the values found in the base-case solution. The water saturation of both HiQ Sand and LoQ Sand are in uniform distributions of 0.05-0.30 and 0.25-0.45, respectively, again representing high uncertainty in these values. The aspect ratios are uniformly distributed in the range 0.0001-0.1000, indicating uncertainty in the degree of continuity of the thin sand and shale beds. Other parameters are restricted to relatively narrower ranges representing lower levels of uncertainty.

FIG. 10 shows a worksheet that gives a view of the values calculated for each Monte Carlo trial. For each trial, random samples are drawn from each of the distributions described in the table of FIG. 8. With these parameters as inputs, the petrophysical forward model is re-calculated with results as shown in FIG. 10. The joint probability index ("Joint PI") is calculated as a measure of the fit between the model-derived log averages and the input log averages. Depending on this measure of fit, the trial parameters are replicated to produce between zero and ten cases for later statistical analysis. The example shown was replicated to produce seven cases. The example shown was trial number 492 of 1000 "successful" trials—those trials whose measure of fit yielded one or more cases.

Figure 11:
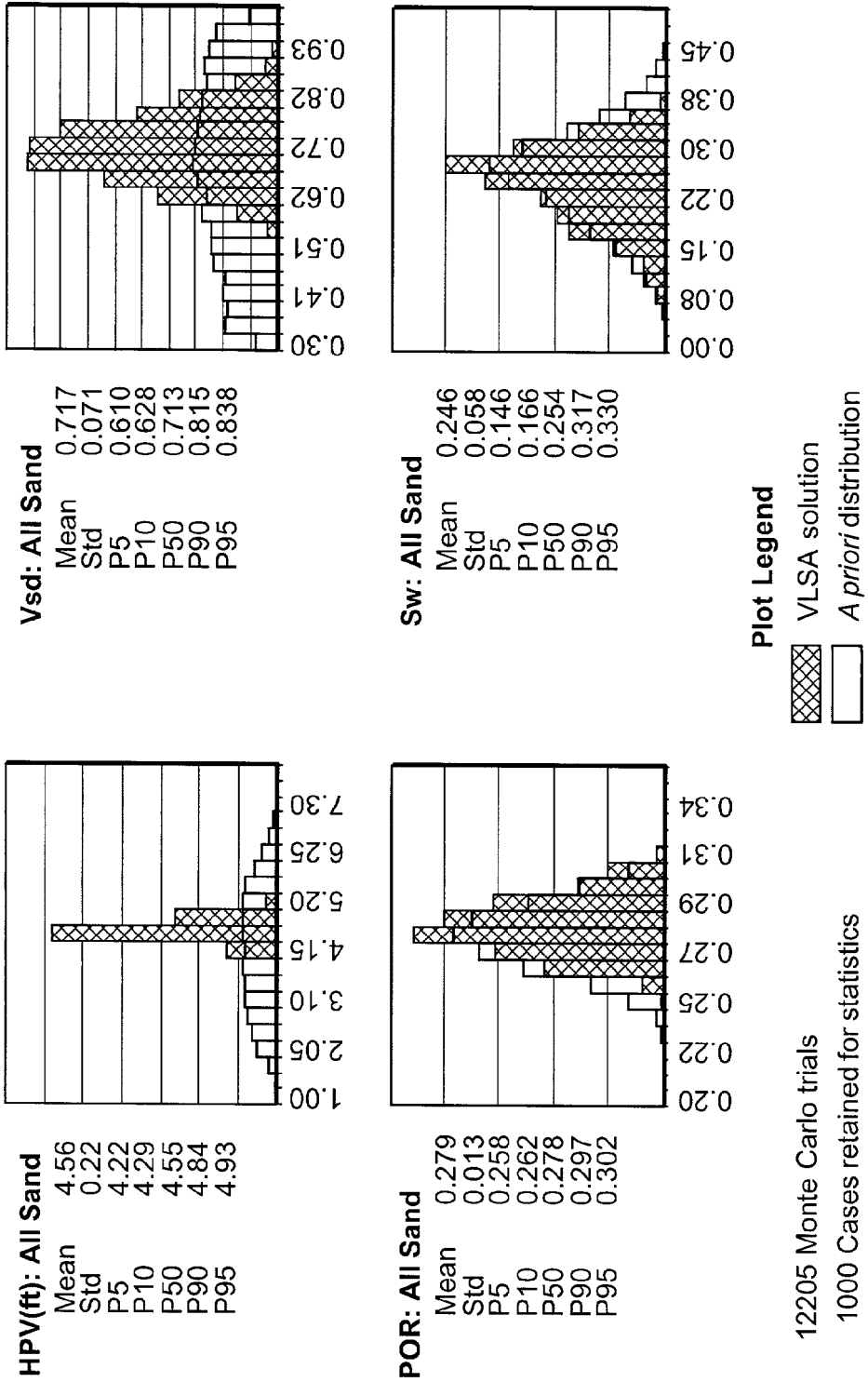
FIG. 11 illustrates the statistics generated by the Monte Carlo inversion analysis on the distributions of feasible solutions for hydrocarbon pore volume, sand fraction, total porosity, and total water saturation, and wherein the shaded histograms represent the distribution of feasible solutions while the empty histograms represent the a priori distributions for each quantity.

After the Monte Carlo simulation, the dataset of retained cases is analyzed. Each of these retained cases represents a feasible solution to the thin-bed problem. The solution is feasible because it meets two conditions: (1) it is within the assumed distributions of the input parameters, and (2) it fits the measured log values to within the tolerance specified by the log standard deviations. The analysis generates and displays statistics on these feasible solutions. FIG. 11 shows this statistical display for the combined HiQ and LoQ sand bed types. Counterclockwise from the upper left, statistics are presented for the hydrocarbon pore volume HPV(ft), the average sand porosity POR, the average sand water saturation Sw, and the total sand fraction, Vsd. In each plot, the shaded histograms represent the distribution of feasible solutions and the empty histograms represent the a priori distribution for the same parameter.

Several observations about these statistics give an indication of the power of the VLSA method. First, the method recovered a good answer to the thin-bed problem that was posed: the central values (mean and median or P50) for each volumetric result are very close to the known interval-average values for the synthetic dataset, shown in FIG. 6. Second, the method shows that the logs constrain the solution for hydrocarbon pore volume to within a standard deviation of 5% of its value, despite the very high a priori uncertainties assumed for the bed-type fractions and water saturation. Likewise the logs constrain the solution for total sand fraction to within a standard deviation of 10% of its value. On the other hand, water saturation is not constrained at all relative to its a priori distribution, confirming the assertion that the conductivity log loses its sensitivity to water saturation in thinly bedded reservoirs.

Although a particular, detailed embodiment of the present invention has been described herein, it should be understood that the invention is not restricted to the details of the preferred embodiment. It will be apparent to those skilled in the art that many modifications and variations to the embodiment described are possible without departing from the spirit and scope of the present invention.

What is claimed is:

1. A method of analyzing data obtained from well logs taken in a subsurface geological formation having thinly interbedded sandstone and shale layers to determine an expected value of the hydrocarbon pore volume of the formation, comprising:
   (a) defining an initial model of the subsurface formation based upon estimates of different bed types and bed-type parameters in the formation, one of said bed-type parameters being aspect ratio, the initial model including a system of log equations for predicting well logs from bed-type parameters;
   (b) performing a Monte Carlo inversion to find the ranges of bed-type parameters consistent with the measured well log data, wherein performing the Monte Carlo inversion comprises computing distribution statistical data for interval hydrocarbon pore volume; and
   (c) generating a statistical distribution for hydrocarbon pore volume representing the expected value for, and an uncertainty in, the hydrocarbon pore volume from said computing distribution statistical data from said Monte Carlo inversion.

2. The method of claim 1 wherein at least one of said bed types has a finite lateral extent and a positive aspect ratio.

3. The method of claim 1 wherein the step of defining the initial subsurface formation model comprises:
   (a) selecting an analysis interval;
   (b) obtaining average values of the measured well log data over the analysis interval;
   (c) formulating a set of reservoir and non-reservoir bed types constituting the selected analysis interval;
   (d) determining average values of the petrophysical parameters for each bed type;
   (e) assigning relative frequency of occurrence of the different bed types in the formation;
   (f) computing log responses for each bed type and over the composite analysis interval;
   (g) comparing the computed log responses to the measured log data for consistency; and
   (h) repeating steps (b) to (g) until the model parameters are consistent with the measured log data.

4. The method of claim 1 wherein the step of performing the Monte Carlo inversion comprises:
   (a) estimating uncertainty ranges for each bed-type parameter and for bed frequencies;
   (b) generating a random model consisting of random variants for each bed-type parameter and frequency;
   (c) computing estimates of average log responses over an analysis interval of the model;
   (d) comparing estimated log responses to measured log responses for consistency;
   (e) retaining the model only if estimated log responses are consistent with measured log responses;
   (f) repeating steps (a) to (e) until a specified number of trials has been completed; and
   (g) computing distribution statistics for interval hydrocarbon pore volume and related parameters.

5. The method of claim 1 wherein the step of performing the Monte Carlo inversion includes estimating uncertainties for the formation bed properties and for the volume fractions.

6. The method claim 1 wherein the step of performing a Monte Carlo inversion is carried out using a programmed digital computer.

7. The method of claim 1 wherein the formation model has inputs which comprise a set of parameters describing the thinly bedded formation and has outputs which are the formation average porosity, average water saturation, sand fraction, and average hydrocarbon pore volume.

8. The method of claim 7 wherein the accuracy of the input parameters of the formation model are described in terms of probability distributions of parameter values and wherein the step of performing a Monte Carlo inversion involves making a plurality of cases wherein each case comprises a random selection of a parameter value for each input parameter from the probability distribution and calculating a set of outputs.

9. The method of claim 8 wherein the step of performing a Monte Carlo inversion is made using a spreadsheet programmed in a digital computer and wherein each case involves a recalculation of the spreadsheet to obtain a resultant set of outputs.

10. The method of claim 9 wherein the step of performing a Monte Carlo inversion involves making at least one thousand cases and each resultant set of outputs comprises calculated log responses.

11. The method of claim 10 wherein the resultant set of outputs from each case is retained only if that case produces a set of calculated log response outputs which correspond to the input log values within a specified closeness of fit.

12. The method of claim 11 further comprising the step of storing the retained sets of outputs and analyzing them for a determination of uncertainty in the estimate of hydrocarbon pore volume.

13. The method of claim 1, wherein the statistical distribution comprises a histogram representing the expected value for, and an uncertainty in, the hydrocarbon pore volume.

14. The method of claim 13, wherein the histogram represents a distribution of feasible solutions and a priori distributions for the hydrocarbon pore volume.

15. The method of claim 14, wherein generating the statistical distribution comprises presenting probability values for hydrocarbon pore volume and at least one additional volumetric result.

16. The method of claim 4, wherein the statistical distribution comprises a histogram representing the expected value for, and an uncertainty in, the hydrocarbon pore volume.

17. The method of claim 16, wherein the histogram represents a distribution of feasible solutions and a priori distributions for the hydrocarbon pore volume.

18. The method of claim 17, wherein generating the statistical distribution comprises presenting probability values for hydrocarbon pore volume and at least one additional volumetric result.

* * * * *